July 11, 1944.　　　J. C. O'CONNOR　　　2,353,492
VIBRATION PRODUCING MECHANISM
Filed Jan. 16, 1942　　　3 Sheets-Sheet 1
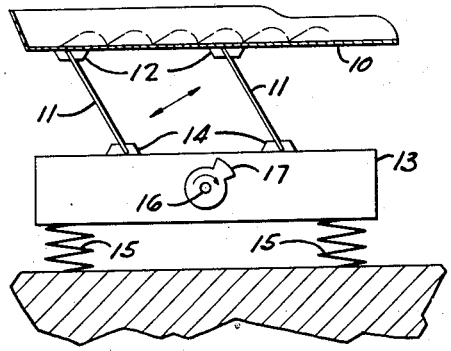
Fig. I
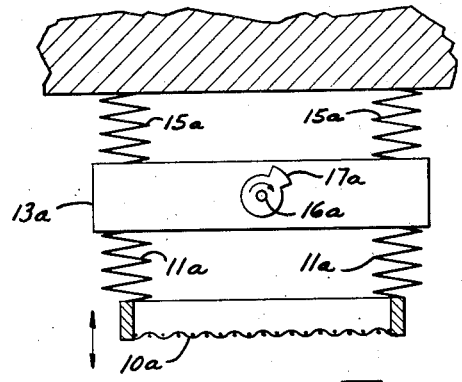
Fig. II
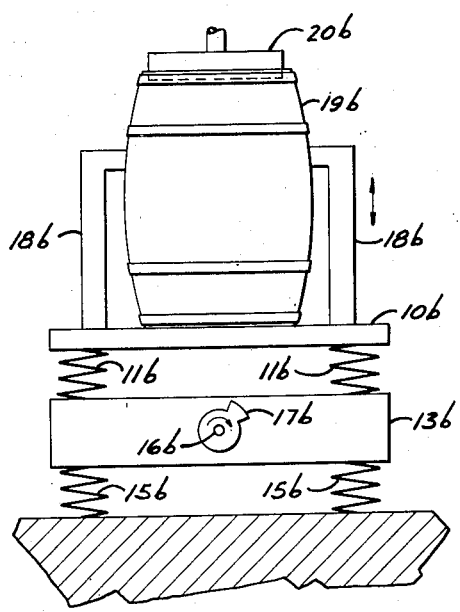
Fig. III
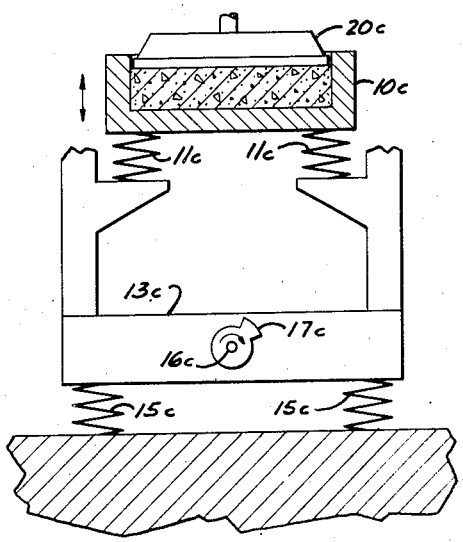
Fig. IV
John C. O'Connor
INVENTOR
BY Marshall & Marshall
ATTORNEYS

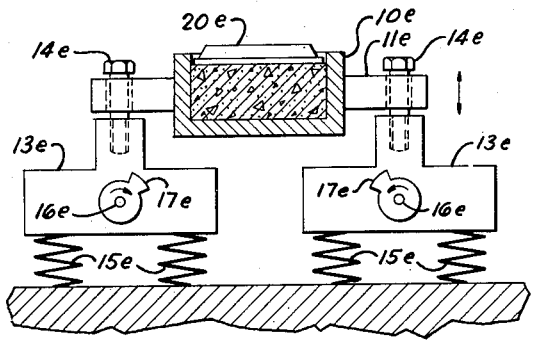
Fig. VI
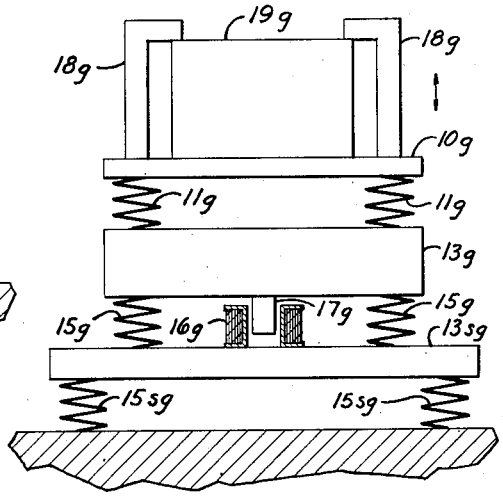
Fig. VII
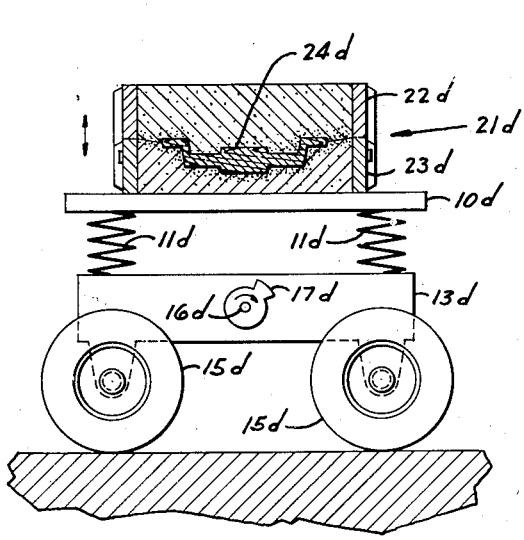
Fig. V
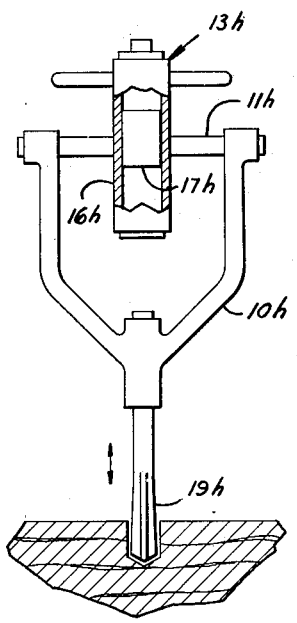
Fig. VIII
John C. O'Connor
INVENTOR
BY Marshall & Marshall
ATTORNEYS

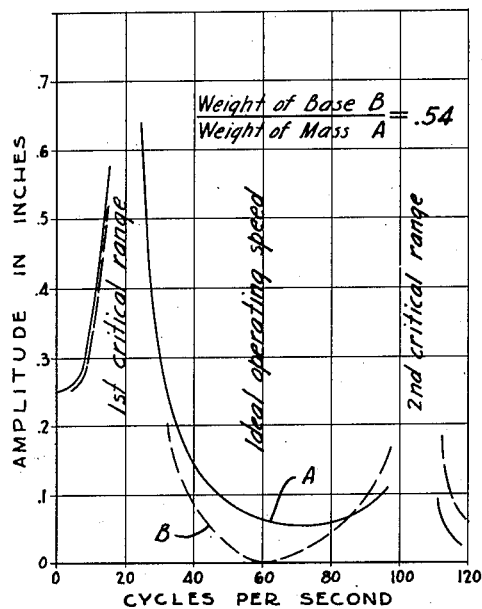
Fig. IX
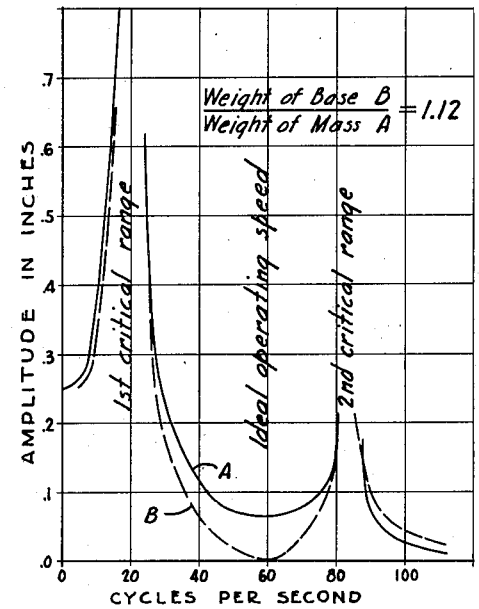
Fig. X
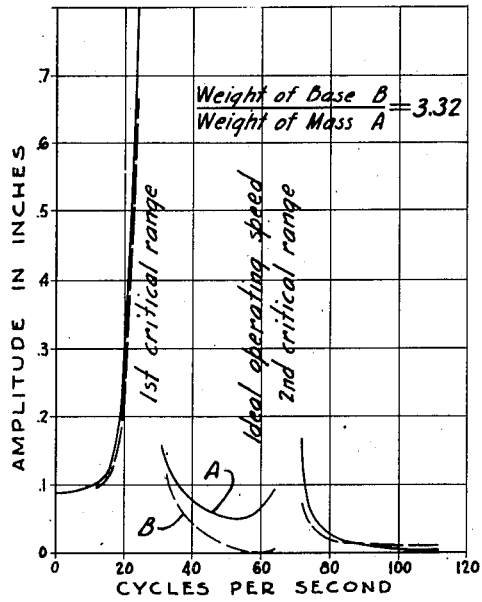
Fig. XI
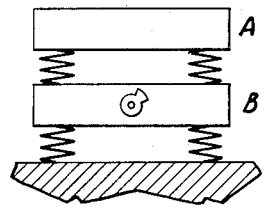
Fig. XII

Patented July 11, 1944

2,353,492

UNITED STATES PATENT OFFICE 2,353,492

VIBRATION PRODUCING MECHANISM

John C. O'Connor, Ann Arbor, Mich.

Application January 16, 1942, Serial No. 427,039

18 Claims. (Cl. 259—1)

This invention relates to vibration producing mechanism.

Machines using mechanically, electro-magnetically or pneumatically created vibration have many different applications. Among such applications are conveying, screening, packing, compacting, drilling, crushing, sorting, grading and other processing operations.

Most machines for these purposes have been actuated directly by electro-magnetic forces, or by directly acting mechanical means, such as cranks and cams and rapidly rotated shafts carrying eccentric weights.

When an electro-magnetic system is used, the armature of the magnet is fastened to the vibratory member and the magnetic coil attached to a relatively stationary frame or vice versa. The magnet is energized by alternating current, and reversals of field result in alternating forces acting between the magnet and the armature which cause the vibratory member to reciprocate very rapidly.

In machines employing the cam principle, the cam itself may be fixed upon a shaft mounted either on the base or on the vibratory member so as to act against the other member, thus alternately rising and dropping the vibratory member to produce alternating vibratory motion.

Devices employing the eccentric weight principle probably are the most economical. They have rotating shafts mounted at right angles to the desired direction of vibration. Eccentric weights attached to the rotating shafts create centrifugal forces which cause vibration of the shafts and the members by which they are supported. In prior devices incorporating revolving eccentric weights the shafts to which the weights are fixed are journaled in bearing fixedly supported by, or fixedly connected to, the members which carry or engage the material to be processed or conveyed.

The application of the vibratory force directly to the vibrating material affecting member is in many ways disadvantageous. It is often desirable that the vibrating member be supported in such a way that there is obstruction free space around it for such operations as charging with material and removing the material after treatment. Where the force is applied directly to the vibratory member, the mechanism for applying that force often limits access to the member. This is particularly true of electro-magnetic machines where large coils and armatures are employed.

Where the vibratory force is created by eccentrically mounted weights, the mounting of the shaft carrying such weights directly on the vibratory member has further serious disadvantages. Because of the vibration of the shaft, along with the vibratory member, the bearings in which the shaft is journaled "peen" and wear very rapidly. In addition, since the best results have been accomplished by limiting the length of the stroke of the vibratory member, the means for doing so is subjected to destructive impacts. Another disadvantage of most vibration producing mechanisms is the fact that such vibration is not completely isolated from the earth, that is to say from the earth and fixed supports, frames, buildings and foundations attached thereto. When this is the case, vibration is transmitted to the frames and then to the buildings or foundations where such machines are used, resulting in noise and disturbance.

Perhaps the most serious disadvantage of prior art vibration producing mechanisms arises from the fact that, although such mechanisms employ resonance between the impressed cyclical force and such springs as may be used to mount the material handling members, they are so constructed that the natural frequency of the resiliently mounted material affecting members must be kept almost exactly the same as that of the impressed cyclical force and vice versa. Thus only slight variations in speed of the impressed force or the weight of the material affecting structure will throw the device out of resonance and seriously decrease its efficiency.

Another serious disadvantage existing in such prior art mechanisms is the employment of inefficient, high-frequency springs. These springs are very ponderous and have high internal coefficients of friction (i. e., damping). Hence large portions of the impressed forces are used to overcome such damping, which means that very large impressed forces must be applied to cause large amplitudes of vibration.

It is an object of this invention to provide a machine having means for producing vibrations of large amplitude which are isolated within the machine itself.

It is another object of this invention to provide a mechanism for vibratory treatment of material which will apply vibrating forces remotely from vibratory material affecting members of the mechanism and will maintain the remaining portions of the mechanism substantially free from vibration.

Still another object of this invention is to provide mechanism for producing vibration in which the input energy is almost entirely utilized in producing vibration of the vibratory elements and not dissipated by being transferred to the earth or other objects.

Another important object of this invention is to provide a machine for treating material by means of vibration in which the speed range between two critical resonance speeds is relatively wide so that high amplitude vibration may be secured over a wide variation in speed of the impressed cyclical force and a wide variation in weight of the vibratory structure; in other words, the employment of resonance without the need for close tuning between the natural frequency of the vibratory structure and the impressed cyclical force.

A further object of this invention is the production of machines for treating material by means of vibration in which energy is applied to a portion of the machine which remains substantially free from vibration and substantially all such energy is transferred to the vibratory material treating members of the machine to produce high amplitude vibration of such members.

A further object of this invention is to provide a spring for the resilient mounting of a material affecting vibratory structure which spring has a low coefficient of friction, is light in weight and will absorb only a small proportion of force applied to the device and will thus produce large amplitude vibration of the material affecting structure from relatively small impressed cyclical forces.

It is a still further object of this invention to provide a vibration producing mechanism employing vibratory forces impressed on a relatively stationary portion of the machine which is isolated from the earth, the vibration being transferred to and utilized by the vibratory members of such machine.

It is a still further object of this invention to provide a mechanism having an eccentrically loaded revoluble shaft and means whereby impulses caused by rotation of the shaft are transmitted, through bearings in which the shaft is journaled, to cause high amplitude vibration of a member carrying, or engaging, material to be subjected to vibratory effects, while the shaft bearings and their supporting structure remain relatively quiescent.

And still another object of this invention is to provide a compacting machine for densifying semigranular material by means of vibration in which the vibratory members of the machine are supported in such position as to afford easy access for charging and removing material and in which vibratory force is applied remotely to the vibratory members by means of force producing mechanism mounted on a portion of the machine which remains substantially vibrationless during operation.

More specific objects and advantages are apparent from the description, in which reference is had to the accompanying drawings illustrating preferred embodiments of the invention.

In the drawings:

Fig. I is a diagrammatic illustration of a vibratory conveyer embodying the invention.

Fig. II is a similar illustration of a vibrating screen embodying the invention.

Fig. III is a diagrammatic illustration of a barrel packing machine embodying the invention.

Fig. IV is a diagrammatic illustration of a concrete block compacting machine which constitutes still another embodiment of the invention.

Fig. V is a diagrammatic illustration of a portable mold compacting machine which is still another embodiment of the invention.

Fig. VI is a diagrammatic illustration of a compacting machine employing a modification of the invention in which adjustable stops are used to tune the impulse transmitting springs.

Fig. VII is a diagrammatic illustration of a mixing device embodying yet another modification of the invention.

Fig. VIII is a diagrammatic illustration of a portable rock drill embodying a simplified modification of the invention.

Figs. IX, X and XI are graphs showing characteristics of devices embodying the invention.

Fig. XII is a simplified diagrammatic illustration of mechanism the characteristics of which are shown in the graphs of Figs. IX, X and XI.

These specific drawings and the specific description that follows merely disclose and illustrate the invention and are not intended to impose limitations upon the claims.

In Fig. I the vibratory conveyer illustrated is composed of a feeding trough 10 which is supported on inclined impulse transmitting springs 11 which are fixedly attached to the trough 10 by means of clamping members 12. The lower ends of the springs 11 are securely attached to the upper surface of a base 13 by means of clamping members 14. The base 13 is supported on cushioning springs 15 which isolate the machine from the earth or frame of the building (represented by the crosshatched fragment). A rotatable shaft 16, which carries an eccentric weight 17, is mounted on the base 13.

The vibratory screen diagrammatically illustrated in Fig. II, consists of a screen 10a which is dependingly supported by impulse transmitting springs 11a from a base 13a which is hung by cushioning springs 15a from a fixed support (again represented by the crosshatched fragment). A rotatable shaft 16a is mounted in the base 13a and carries an eccentric weight 17a.

The operation of the two devices just described is similar in principle. When the shaft 16 or 16a is rotated the resulting rotation of the eccentric weight 17 or 17a impresses a cyclical force on the base 13 or 13a with a period which is equal to the number of rotations per minute of the shaft 16.

The cushioning springs 15 or 15a, which support the base 13 or 13a, do not hold it rigidly against movement and, although the base 13 or 13a is thus floated, the system may be designed so that the base does not vibrate as a whole in response to the impulses applied to it by the action of centrifugal forces on the shafts 16 or 16a because its vibration is resisted by equal and opposite forces applied at every instant to the base by the impulse transmitting springs 11 or 11a.

When the natural frequency of the impulse transmitting springs 11 or 11a and the mass carried thereby is close to the frequency of the cyclical impulses resulting from the action of centrifugal forces on the rotating shaft, its bearings and the base, the vibration of the springs and the mass carried thereby automatically so synchronizes with the cyclical impulses resulting from the centrifugal forces that each impulse imparted to the base is counteracted constantly, as it rises to maximum and recedes, by an equal oppositely directed rising and receding impulse applied to the base by the springs 11 or 11a. Thus there are no net vibratory forces acting to vibrate the base as a whole and the base may thus be said to act as the nodal point in the vibrating system composed of the mechanism causing the vibration, the base, and the mass which is spring-mounted on the base.

Under such conditions the impulses imparted to the base are transformed into what may be termed "wandering impulses" that are transmitted through the base and the springs 11 or 11a to the mass 10 or 10a. These "wandering impulses" cause vibration of the trough 10 or the screen 10a in the direction which the springs 11 or 11a are permitted to vibrate (in each case shown by the arrow in the figure).

In Fig. I the theory of conveying operation is that the vibration of the trough 10 tosses the particles being conveyed thereby upwardly and forwardly and when the trough 10 is returned in the other direction, it moves backward beneath the particles. This action results in the particles being moved approximately through paths shown diagrammatically by the dotted lines in Fig. I so that they are conveyed or fed along the trough 10. In Fig. II, the vibration of the screen 10a breaks up large particles of material and sifts the smaller particles through the mesh of the screen.

It has been observed that machines employing the above described two-degree of freedom suspension can be operated so that their base members do not vibrate to any appreciable extent. The results of this type of operation are highly advantageous. Since the base members do not vibrate the life of the bearings in which the shafts rotate is thereby prolonged. Also the operation of the device is much less noisy than devices constructed in other ways because the soft base springs do not transmit the vibrational impulses to the floor and other sound radiating sources.

In Fig. III there is illustrated a barrel packing device which consists of a deck 10b supported on impulse transmitting springs 11b which are in turn supported by a base member 13b mounted upon cushioning members 15b that in turn are attached to the earth or a solid framework. A shaft 16b, bearing an eccentric weight 17b, is mounted for rotation on the base member 13b. Two clamps 18b are securely attached to the upper surface of the deck 10b and hold a barrel 19b securely in place on the deck 10b. A pressure head 20b can be lowered upon the material being compacted in the barrel 19b and is shown so lowered in Fig. III.

The pressure head 20b is used to form a smooth upper surface on the material being compacted and to assist in compacting the upper portion of the material as well as to prevent very light or fluffy material from being jarred out of the barrel during compacting.

In Fig. IV there is diagrammatically illustrated a concrete block compacting device. This device comprises a mold box 10c which is supported upon resilient members 11c which in turn are mounted upon the frame of a base member 13c. The base member 13c is cushioned on the earth by means of springs 15c and mounts a rotating shaft 16c which carries an eccentric weight 17c. A pressure head 20c rests on the upper surface of the concrete being compacted in the mold box 10c.

In Fig. V there is illustrated a portable molding sand compacting device which comprises a deck 10d to which is attached a mold flask 21d made up of two parts, a cope 22d and a drag 23d containing the molding sand being compacted around a pattern 24d. The deck 10d is supported by means of springs 11d on a base member 13d. The base member is carried by means of rubber-tired wheels 15d and mounts a rotatable shaft 16d which carries an eccentric weight 17d. The resiliency of the rubber tires 15d serves to support the base member 13d in the same manner as the springs 15c in the device illustrated in Fig. IV and yet the machine is portable and may be moved from place to place to accommodate different molders in different parts of a foundry.

In Fig. VI there is illustrated a concrete compacting device consisting of a mold box 10e supported by means of an impulse transmitting spring 11e upon base members 13e. The impulse transmitting spring 11e may be made of wood or other resilient material. The base members 13e are in turn mounted upon base springs 15e which cushion the device from the earth. In each of the base members 13e there is located a rotating shaft 16e which carries an eccentric weight 17e. The two shafts 16e turn at the same speed but in opposite directions. Thus the vertical components of the centrifugal forces created by the two eccentric weights 17e are added together and the horizontal components of the centrifugal forces are cancelled. A pressure head 20e may be lowered upon the material being compacted in the mold box to compact its upper surface. The resonance of the device is controlled by changing the natural frequency of the vibratory structure by means of bolts 14e which pass through the spring 11e and are threaded into the base members 13e. By turning up or backing out the two bolts 14e the gaps between the spring and the bolt heads may be narrowed or widened. Narrowing or widening the gaps has the effect of changing the natural frequency of the vibratory structure, which thus may be tuned to the frequency of the rotating shaft 16e.

In Fig. VII there is illustrated a mixing device which includes means for isolating the vibrations of a straight line vibratory motor from the earth. This device comprises a deck 10g mounted on impulse transmitting springs 11g which are supported by a base member 13g. The base member 13g is in turn mounted upon resilient means 15g which are supported upon a secondary base structure 13sg which is cushioned from the earth by soft secondary base springs 15sg. A stator 16g is mounted on the secondary base 13sg and an armature 17g is attached to the base 13g. Clamps 18g securely hold a receptacle 19g on the deck 10g. The secondary base and its cushioning springs isolate the vibration of the stator from the earth and the impressed cylical force created in the reciprocating motor is applied to the vibratory deck 10g through the impulse transmitting springs. This secondary isolating means is particularly advantageous when employed with a magnetic straight line vibratory motor because in such motor the stator is drawn toward the armature with a force equal to that with which the armature is drawn toward the stator and this force acting on the stator should preferably be isolated from the earth to avoid dissipation of energy.

In Fig. VIII there is illustrated a rock drill which is adapted to be held by hand. This drill comprises a base member 13h in which there is located a cylinder 16h and weight 17h. The weight 17h is pneumatically vibrated and, since it is guided in the cylinder 16h, applies a vertical straight line force to the base 13h. Impulse transmitting springs 11h which may be made of wood, steel or other resilient material are securely attached to the base 13h. A vibratory structure 10h is attached to the impulse transmitting springs 11h, and has secured to its lower end a rock cutting drill 19h. The impressed cyclical force created by the reciprocatory weight 17h is applied through the impulse transmitting springs to the vibratory structure 10h and the drill attached thereto, and not to the hands of the operator as he grasps the device by means of handles which form a part of the base member 13h.

It is not necessary that the natural frequency of the base and the parts fixed thereto and the springs or other means by which the base is floated, bear any exact relation to the natural frequency of the vibrating system consisting of the impulse transmitting springs and the mass carried thereby. The principal function of the springs that cushion the base is to support the base in floating condition so that impulses applied to it are not received by the earth or fixed supporting foundation or structure. The base may be hung by cables or actually floated in a liquid.

No exact ratio of the mass of the base to the mass carried by the impulse transmitting springs is necessary. Either the base or the mass carried by the impulse transmitting springs may be the heavier. It has been found however that for most operating conditions the mass of the floating base should more or less approximate the mass carried by the impulse transmitting springs.

In designing a machine to embody the vibratory mechanism of the invention, the impulse transmitting springs and the mass carried thereby should be given such a natural frequency that they will vibrate with a frequency corresponding to that of the impulses to be impressed upon the machine. It is desirable that this frequency be as high as practicable and since electric motors running at 3600 R. P. M. are available, and for other practical and commercial reasons, an impressed impulse frequency of 3600 per minute, or 60 per second, is a good selection.

The mass to be carried by the impulse transmitting springs will be determined to some extent by the character of the operation to be performed. In a concrete packing device, for example, the mass will be that of the mold box and of a sufficient structure to properly support it. The impulse transmitting springs should be so designed, mounted and connected to the mass carried by them that the springs and mass will vibrate with a frequency of 60 vibrations per second.

The vibration frequency of the cushion supporting the base (i. e., the member upon which the eccentric weight carrying shaft is mounted, or to which are applied impulses otherwise created) should be so designed that its horizontal and vertical frequency of vibration is sufficiently different from that of an impressed cyclical force to attenuate the horizontal components, and prevent the impulses from being transmitted to the floor.

Figs. IX, X and XI show calculated curves of amplitude of vibration of the two masses, that is, the vibratory structure and the base, resulting from changes in the speed of rotation of the eccentrically weighted shaft. In these curves the internal friction or damping of the impulse transmitting springs is ignored.

Amplitudes of vibration of the vibratory structure are plotted vertically and eccentric weight shaft speed in cycles per second is plotted horizontally. For simplicity in calculating the curves the centrifugal force resulting from the rotation of the eccentric weights is assumed to remain constant through the speed range. In a practical machine, unless the eccentric weights were moved closer to the shaft as the shaft speed increased, there would be an increase of centrifugal force accompanying an increase in shaft speed. This would not however materially change the general form of the curves.

Fig. XII is a simplified diagrammatic illustration of the mechanism the characteristics of which are shown in the graphs of Figs. IX, X and XI and in which the vibratory structure is designated by the letter "A" and the base by the letter "B." In the curves of Figs. IX, X and XI the solid lines, which are marked "A," are the loci of points indicating the amplitude of vibration of the upper vibratory mass at given shaft speeds and the dash lines, which are marked "B," are the loci of points indicating the amplitude of the base structure at given shaft speeds. For reasons of economy and availability of electric motors, an ideal operating speed of 60 cycles per second or 3600 R. P. M. has been chosen.

Because of the assumption of constant centrifugal force, the calculated zero frequency amplitude of both masses appears at the left side of each of the graphic illustrations as having a finite value. As the speed is increased, the amplitude of both members increases rapidly until it reaches what may be termed "the first critical range." During this increase in speed both members are in phase with the impressed cyclical force i. e., their movement is in the same direction as the movement of the eccentric weights. A critical range, or range of critical speeds, is that range of speeds during which the phase relationship of a mass to the impressed cyclical force changes from positive to negative. By this is meant that prior to entering this range of speeds the mass moves in the same direction as the applied force and during this critical range the direction of movement of the mass shifts 180° and the mass moves oppositely to the impressed force. Theoretically this change in phase relationship takes place through infinity but actually, because of damping of the impulse transmitting springs, the vibrations of the vibratory structure and the base during the critical range are finite, although excessive.

As the speed increases from the first critical range to a selected speed (the ideal operating speed) at which the frequency of the impressed force corresponds to the selected natural frequency of the vibratory structure or upper mass on its supporting spring or springs, the amplitude of vibration of both masses decreases and both masses are out of phase with the impressed force. At the ideal operating speed the amplitude of vibration of the base is substantially zero and each impulse imparted to the base is counteracted by an equal oppositely directed impulse applied to the base by the impulse transmitting springs. Thus there are no net vibratory forces acting to vibrate the base as a whole. At this ideal operating speed the amplitude of vibration of the upper mass is substantially greater than zero but as the speed increases from the ideal operating speed the amplitudes of vibration of the two masses increase until they reach a second critical range and thereafter a decrease in amplitude takes place.

In an actual machine the damping of the impulse transmitting springs decreases the theoretical amplitudes by absorbing a portion of the impressed cyclical force and thus tends to reduce the peaks reached in the critical ranges.

The differences between the curves illustrated in Figs. IX, X and XI show the effects of changing mass ratios of the base mass to the vibratory mass. The upper mass or vibratory structure has the same weight and the impulse transmitting springs have the same constant for all of the curves; the only variation in Figs. IX, X and XI being in the weight of the base mass. The graphs of Fig. IX show characteristics of a device in which the ratio of the weight of the base to the weight of the vibratory mass is .54. The graphs of Fig. X show characteristics of a device in which the ratio of the weight of the base to the weight of the vibratory mass is 1.12. The graphs of Fig. XI show characteristics of a device in which the ratio of the weight of the base to the weight of the vibratory mass is 3.32.

By comparing these three sets of graphs it can be seen that the major result of changing the base weight is to shift the position of the second critical speed horizontally. Making the base lighter moves the second critical speed to the right. It does not change the ideal operating speed or alter appreciably the first critical speed.

When the two masses are approximately equal as illustrated by the graphs in Fig. X, the constant ideal operating speed is approximately equally removed from the two critical speeds. It will be observed that the continuous line along which are plotted the vibration amplitudes of the mass carried by the impulse transmitting springs is nearly parallel to the horizontal base line at the operating speed. Therefore, a slight change in speed of the impressed cyclical force or a slight change in the weight of the mass carried by the impulse transmitting springs (and ergo, of the natural frequency of the vibratory structure) will not change the amplitude of vibration of the vibratory structure very greatly, as is shown by the fact that these changes occur on the more or less horizontal section of the curve of vibratory amplitudes of the vibratory structure. This feature of the invention is particularly advantageous in a machine such as a concrete compacting machine where the weights of mold boxes may vary considerably depending upon whether they are cored or not.

Conditions such as those illustrated in Fig. X are extremely beneficial for conveyers or vibrating screens or other devices in which the rate of feed of the machine is variable because wide changes in operating speed can be made without diminishing appreciably the amplitude of the vibratory portions of the mechanism.

Examination of the curves shown in Figs. IX, X and XI discloses that a wide range of ratios between the weight of the base and the weight of the vibratory mass may be employed in different types of machines without decreasing the amplitude of vibration to such an extent that the effectiveness of the machine is destroyed. Because of the fact that the "resonance range" is large, the impulse transmitting springs and the weight carried thereby can be varied somewhat with respect to the mass of the base of the machine.

It is possible to construct machines of different types with radically different arrangements of vibratory structures and base members. By proper design incorporating the principles of the invention herein outlined, the base may be held in a relatively quiescent condition and the vibratory structure vibrated through a large amplitude or if it is not necessary that the base be kept stationary an even larger amplitude of vibration of the vibratory structure may be achieved.

Special machines may require special analysis to determine optimum mass ratios. With almost any mass ratio the breadth of resonance range of devices incorporating the principles of this invention will be greater than that attainable in other devices.

The position of the first critical range is determined by the vertical natural frequency of the superimposed mass and its spring. Softening the base spring moves the first critical range to the left. Theoretically, then, an infinitely soft base spring would put the first critical range at zero. Such a condition could be realized by placing the two masses and their coupling spring in space. The unit would function as before with the base standing still at the ideal operating speed.

It is this consideration which led to the development of the hand-held vibrating drill illustrated in Fig. VIII. Such a device may be placed in a partially drilled hole, to hold it in vertical position, and released, and the action of the drill against the bottom of the hole would levitate the entire device with the drill, during most of the time, away from the bottom of the hole, and the impressed cyclical force applied to the base member would be transmitted through the connecting impulse transmitting springs to the drill thus causing it to strike the rock.

The mold box spring $11e$ as shown in Figure VI may be made of wood. It has been found that the use of wooden springs is very advantageous for several reasons. In the first place, contrary to anything shown in the prior art or which might be expected, wooden springs for the purpose disclosed can be approximately two-thirds the volume and one-fifteenth the weight of steel springs having the same spring constant. Hence by using small and very light wooden springs each different type of mold box, each of which may have a different weight, may be equipped with springs having the proper constant for that particular weight. Thus radically different mold boxes may be used since their particular springs can be designed to give the vibratory system the same natural frequency as the impressed cyclical force. Because of the great weight and high cost of steel springs, tuned interchangeable mold box and spring assemblies with steel springs would be much less practicable. Moreover, wooden springs for this purpose possess the further advantage that the power required to vibrate their "nonpay" load is relatively small, not merely because they are light but also, and principally, because of the little known fact that their coefficient of internal damping is far less than that of steel springs.

If it were not for the fact that a great deal of energy is required to overcome the internal damping of the springs, the pulsating force which is applied to the mechanism could be much less. It would only have to be of sufficient strength to jostle the material being compacted to cause the small particles to fill all of the "voids" between the larger particles. However, because of the internal damping of the springs, the impressed force must overcome both the resistance of the material to compacting and the internal damping of the springs themselves. This latter requirement consumes by far the major part of the pulsating force in overcoming the friction among the molecules of the springs.

The damping caused by the friction within the material being treated and between the material and the mold box sides is comparatively little. Because of the energy consumed in internal spring damping, the power required to obtain vibration amplitudes of spring carried masses such as are efficacious in concrete compacting operations is very great. For example, to put a 280 pound mold box supported on steel springs into resonance with an impressed cyclical force at 3600 R. P. M. would require two springs of fourteen leaves each, the leaves each being 24 inches long, 3 inches wide and ¼ inch thick, or a total volume of steel equal to 504 cubic inches and weighing 143 pounds. Such a spring would require centrifugal forces of nearly two tons to obtain a vibration amplitude of .05 inch on a concrete compacting machine, but two springs of maple 24 inches long, 5½ inches wide and 1¼ inches thick, having a total volume of 330 cubic inches and weighing 9.55 pounds, require less than one ton of centrifugal force to get the same amplitude on the same machine. Thus the wooden springs do the same job as the steel springs with one-half the power input, yet the wooden springs and the steel springs have the same spring constant. Because of the lower power input requirement, less strain is put on the vibrator shaft, less damage occurs to the bearings, and less oil is required for lubrication.

In constructing a compacting machine incorporating wooden springs illustrated schematically in Fig. VI, the two bases 13e and the parts attached thereto are made of approximately the same weight as the rigid structure that includes the mold box 10e carried by the wooden spring 11e. If the base and the parts carried thereby are approximately as heavy, say not more than one-fourth heavier or one-fourth lighter than the mass carried by the impulse transmitting wooden springs, variations of a few pounds in the weight of the mold box, such as may occur in manufacture or when a mix is packed, will not change the measurable amplitude of mold box vibration. Neither will small variations in spring dimensions, moisture content, or slight damage change the amplitude. Furthermore considerable variation in take-up on bolts holding the springs is possible without great changes in amplitude of either the mold box or the base. In fact approach to a one to one weight ratio between base and vibratory structure eliminates most of the manufacturing and operating difficulties of high speed resonance vibration machines.

The embodiments of the invention herein shown and described are to be regarded as illustrative only, and it is to be understood that the invention is susceptible to variation, modification and change within the spirit and scope of the sub-joined claims.

Having described the invention, I claim:

1. In a device of the class described, in combination, a resiliently mounted base member, a vibratory member, resilient means for supporting said vibratory member from said base member, and means for impressing cyclical force of definite frequency upon said base member only, the natural frequency of said resilient means being substantially equal to the frequency of the cyclical force impressed upon said base member.

2. In a device of the class described, in combination, a resiliently mounted base member, a vibratory member, resilient means for supporting said vibratory member from said base member and cyclical force impressing means acting on said base member only, said vibratory member and said base member having a weight ratio approaching 1:1.

3. In a device for working material by vibration, in combination, a vibratory structure, an impulse receiving member, cushioning means supporting said impulse receiving member, resilient means supporting said vibratory structure from said impulse receiving member, a shaft journaled on said impulse receiving member and carrying eccentric weights, and means for rotating said shaft.

4. In a device for working material by vibration, in combination, a vibratory material affecting structure, a floatingly mounted base member, resilient means connecting said base member and said vibratory affecting structure a shaft journaled on said base member, said shaft bearing eccentric weights, and means for rotating said shaft at a definite number of revolutions per minute, said vibratory material affecting structure being tuned to a frequency substantially corresponding to the revolutions per minute at which said shaft rotates.

5. In a device of the class described, in combination, a vibratory structure, a base, wooden resilient means for supporting said structure, said wooden resilient means being supported by said base, other resilient means for mounting said base, and mechanism for applying a cyclical force substantially equal in frequency to the natural frequency of said structure on said resilient means to said base only.

6. Vibration producing mechanism comprising, in combination, an impulse receiving member vibrationally isolated from the earth, material affecting means resilient means connecting said impulse receiving member and said material affecting means, and means for imparting cyclical impulses only to said impulse receiving member, at a frequency substantially equal to the natural frequency of said material affecting means on said resilient means.

7. A device for compacting material, comprising material containing means, a base structure vibrationally isolated from the earth, wooden springs supporting said material containing means from said base structure, and means for applying a cyclical force to said base structure only, such force being substantially in resonance with said material-containing means on said springs.

8. In a material compacting device, in combination, material containing means, a base structure, wooden springs mounted on said base structure and supporting said means, nonrigid means for supporting said base structure and means for creating an impressed cyclical force on said base structure only, such force being substantially in resonance with said material-containing means on said springs.

9. In a machine for compacting granular material, in combination, material containing means, a frame, resilient means for supporting said material containing means mounted on said frame for vibration in a specified direction, said resilient means and said material containing means supported thereby forming a vibratory system having a natural frequency of vibration, cushioning means supporting said frame and mechanism for imparting cyclical forces to said frame, such cyclical forces having the same frequency as that of said vibratory system, said cushioning means supporting said frame having a natural frequency of vibration for vibrations at right angles to the direction of vibration of said system sufficiently different from the frequency of vibration impressed by said mechanism to avoid resonant vibrations of said frame at right angles to such direction of vibration of said system.

10. In a device for performing work by vibration, in combination, work performing means, a base-like member vibrationally isolated from the earth, springs mounted on said base-like member and attached to said means, and mechanism for impressing a cyclical force to said base-like member only of frequency substantially equal to the frequency of said means on said springs on said base-like member.

11. In a device for working material by vibration, in combination, material working means, a base, means for supporting said base in vibrational isolation from the earth, resilient means mounted on said base and supporting said material working means, and mechanism for impressing cyclical force of definite frequency to said base only, such force being substantially in resonance with the natural frequency of said material working means on said resilient means, said mechanism being self-contained and not requiring other bodies against which to react.

12. In a device for operating on material by vibration, in combination, material affecting means, a base, means for vibrationally isolating said base from the earth, resilient means mounted on said base constituting sole support of said material affecting means, and mechanism for applying a cyclical force to said base with a frequency substantially equal to the natural frequency of said material affecting means on said resilient means, the ratio between the masses of said material affecting means and said base being approximately 1:1.

13. In a device for operating on material by vibration, in combination, material affecting means, a base, means for vibrationally isolating said base from the earth, resilient means mounted on said base for supporting said material affecting means, and mechanism mounted on said base for applying a cyclical force only to said base with a frequency substantially equal to the natural frequency of said material affecting means on said resilient means, the ratio between the masses of said material affecting means and said base being approximately 1:1.

14. In a device for operating on material by vibration, in combination, material affecting means, a base, means for vibrationally isolating said base from the earth, resilient means mounted on said base for supporting said material affecting means, and mechanism for applying cyclical force of definite frequency directly to said base and to said base only, said mechanism being free of reaction on other bodies, such force being substantially in resonance with the natural frequency of said material affecting means on said resilient means, the ratio between the masses of said material affecting means and said base being approximately 1:1.

15. In a device for operating on material by vibration, material contacting means, a base-like structure, wooden springs mounted on said structure and supporting said material contacting means, means for vibrationally isolating said structure from the earth, and mechanism for impressing cyclical force, of a frequency substantially equal to the natural frequency of said material contacting means on said base-like structure only, the ratio between the masses of said base-like structure and said material contacting means being substantially 1:1.

16. In a device for operating on material by vibration, material contacting means, a base-like structure, wooden springs mounted on said structure and supporting said material contacting means, means for vibrationally isolating said structure from the earth, and mechanism for impressing cyclical force of substantially definite frequency on said base only, said mechanism being self-contained and not requiring other bodies against which to react, such force having a frequency substantially equal to the natural frequency of said material contacting means, on said base-like structure, the ratio between the masses of said base-like structure and said material contacting means being substantially 1:1.

17. In a device of the class described, in combination, a base, means for vibrationally isolating said base from the earth, a material affecting member, resilient means for supporting said member from said base, self-contained mechanism for applying cyclical forces of definite frequency to said base only, such forces being equal in frequency to the natural frequency of said member on said resilient means, said resilient means receiving such forces and transmitting such forces to said member and receiving and transmitting equal and opposite forces to said base, whereby said member vibrates substantially in resonance with the first mentioned forces and said base remains substantially stationary.

18. In a device for operating on material by vibration, in combination, an impulse receiving member free of rigid support, a material contacting member, resilient means for forming the sole connection between said impulse receiving member and said material contacting member, vibration producing means solely supported by said impulse receiving member comprising a cyclically moving mass the motion of which mass applies cyclical force to said impulse receiving member, said resilient means allowing vibration of said material contacting member in response to the cyclical force applied to said impulse receiving member and applying reaction forces produced by the vibration of said material contacting member to said impulse receiving member to maintain said receiving member in substantially quiescent condition.

JOHN C. O'CONNOR.

CERTIFICATE OF CORRECTION.

Patent No. 2,353,492. July 11, 1944.

JOHN C. O'CONNOR.

It is hereby certified that error appears in the printed specification of the above numbered patent requiring correction as follows: Page 1, first column, line 38, for "bearing" read --bearings--; and second column, line 30, for the word "vibrations" read --variations--; page 5, first column, line 38, before "speed" insert --the--; line 45, for "curve of vibratory" read --curve of vibration--; and that the said Letters Patent should be read with this correction therein that the same may conform to the record of the case in the Patent Office.

Signed and sealed this 22nd day of August, A. D. 1944.

Leslie Frazer (Seal) Acting Commissioner of Patents.